Oct. 16, 1928.
A. E. PETERSON
1,687,786
CHECKERWORK AND BRICK THEREFOR
Filed Sept. 1, 1926
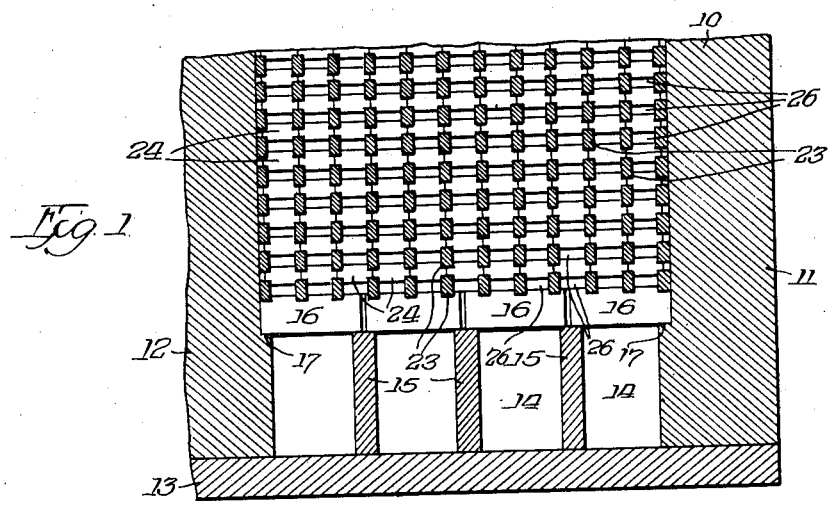
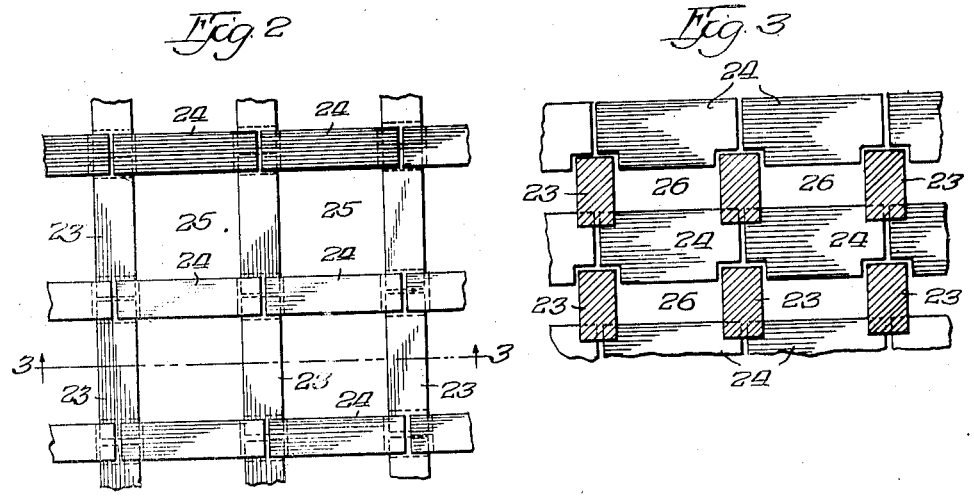
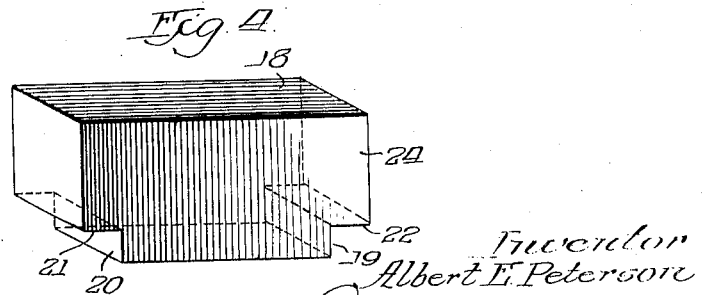

Patented Oct. 16, 1928.

1,687,786

UNITED STATES PATENT OFFICE.

ALBERT E. PETERSON, OF CHICAGO, ILLINOIS.

CHECKERWORK AND BRICK THEREFOR.

Application filed September 1, 1926. Serial No. 132,996.

My invention relates to improvements in the checkerwork used in connection with the regenerators for use in melting and reducing furnaces, hot blast stoves, coke oven construction, and the like, and also to a special design of brick of which the checkerwork is constructed.

The primary object of my invention is the provision of checkerwork construction having uniform horizontal and vertical passages therethrough through which the gas and air pass with a maximum amount of surface of the bricks exposed to the air and gas as it passes through the checkerwork so that the heat is quickly and readily absorbed from the checkerwork, and which quickly absorbs heat units from the waste gases as they are passed through the checkerwork when it is being heated.

Another and further object of my invention is the provision of a checkerwork which is stable and in which the bricks will not side slip, thus closing or partially closing the vertical passages therethrough and stopping the flow of gas through a particular passage thus decreasing the efficiency of the regenerator.

Another and further object of my invention is the provision of a checkerwork having comparatively small passages therethrough, thus bringing the waste gases into intimate contact with the bricks so the heat therefrom is readily and quickly absorbed and also providing a maximum amount of exposed surface by means of which the incoming air or gas absorbs the heat units from the bricks making up the checkerwork.

Another and further object of my invention is the provision of checkerwork formed of bricks placed in edgewise relation with each other, thus maintaining the necessary mass to absorb the heat quickly with flues of sufficient size to accommodate a large quantity of air or gas, or waste gas, without spreading the checkerwork over such a large area, and also spacing apart from each other the bricks forming the checkerwork and placing them in engagement with each other along a small portion of their edges thereby exposing all of the sides and edges of the brick and therefore a greater area thereof to the waste gases from which the heat units are absorbed and also providing for a quick absorption of the heat units by the air and gas forced through the checkerwork.

Providing proper regenerative chambers for the absorption of a maximum quantity of heat units from the waste gases and providing for the absorption of the heat units by the incoming air and gas is the primary purpose sought by all regenerative chambers. The vertical passages must be comparatively small through the checkerwork or else the gas will channel and a large quantity of the waste gas is not brought into contact with the brick surface so that a large quantity of heat units is wasted because they are not absorbed by the checkerwork. When the draft is reversed and the air and gas forced through the checkerwork the incoming air or gas is apt to channel through the checkerwork and not be brought into contact with the brick surface so that the air or gas is not heated quickly to the temperature desired before it reaches the place of consumption. It is essential, of course, that the flues or passages through the checkerwork be kept open and free for the passage of the outgoing waste gases and the incoming air and gas and with my special design of brick the checkerwork is in locked relation so that side slippage of the bricks is prevented and the checkerwork held in stable position so that the flues or passages are not apt to be closed because of the brick slipping sideways and partially closing the passages.

There is, of course, in all waste gases, a certain amount of iron oxide and other impurities carried out by the gases and deposited upon the bricks and for this reason the bricks in edgewise relation will not catch such a large quantity of this material and in addition thereto, the sides of the bricks being of larger area and therefore exposed to the gases to a greater extent, will also absorb more quickly the heat from the outgoing gases and will give off their heat more readily to the incoming air and gas. It has not been possible heretofore to construct a regenerative chamber having the bricks in edgewise relation with each other because of the slippage of the bricks, particularly in the lower courses thereof, as the weight of the bricks in the upper courses is sustained by the bricks in the lower courses and in any amount of vibration there is apt to be slippage of these bricks thus closing up the vertical passages. It is necessary, of course, to maintain a predetermined mass of brick for the proper absorption of the heat units and it is the primary purpose of my invention to so arrange the mass of bricks that the vertical passages formed in the checkerwork allow for the free passage of the gas at all times and though the gas may spread throughout the chamber underneath the courses of brick so that communicating passages are formed between the vertical passages so that if there is any variation in pressure the gas will spread out or if for any reason one passage becomes clogged the gas will spread out and pass around this vertical passage without materially impairing the operation of the checkerwork.

These and other objects of my invention will be more fully and better understood by reference to the accompanying sheet of drawings and in which:—

Figure 1 is a vertical sectional view through the lower portion of a regenerator showing my improved checkerwork;

Figure 2 is a fragmentary plan view of the bricks making up the checkerwork in the regenerative chamber;

Figure 3 is a view partially in section and partially in elevation along the lines 3—3 of Figure 2, the bricks being spaced apart from each other to better illustrate the method of placing them in the courses; and Figure 4 is a view in perspective of one of the bricks for making up the checkerwork illustrated in the preceding figures.

Referring now specifically to the drawings, a section of a regenerator 10 is shown having side walls 11 and 12 and the usual bottom 13 and having air and gas passages 14, 14 therein with sustaining walls or foundations 15, 15 which are adapted to support the checkerwork with which my invention has to do. Supported by the walls 15, 15 is a plurality of tiles 16, 16 the outermost of which rest upon shoulders 17, 17 formed in the side walls 11 and 12 respectively, the tiles 16, 16 forming the foundation for the checkerwork with which the interior of the regenerative chamber is filled. The checkerwork is composed of bricks 18 (Fig. 4) of the usual form and size, namely approximately 8 inches in length, 2 inches in thickness and 4 inches in width with the exception that upon one edge of the brick at each of the ends thereof a recess is formed providing a pair of vertical shoulders 19 and 20 on the brick with a pair of horizontally extending bearing surfaces 21 and 22 respectively and which are adapted to engage the bricks forming the adjacent lower course, so that side slippage of the checkerwork and bricks composing it, is prevented and at the same time an interlocked stable structure is provided.

The method of laying the bricks is illustrated in Figures 2 and 3 and in which a plurality of horizontal courses 23, 23 are provided, these courses being arranged in spaced horizontal relation with each other of approximately the distance of the edge of the brick from the shoulder 19 to the shoulder 20, a slight additional space being provided to accommodate the expansion of the brick. The lowermost course is laid upon the tiles 16, 16 with the surfaces 21 and 22 of the bricks in engagement with the upper edges of the tiles 16, and with the shoulders 19 and 20 extending down alongside the sides of the tiles 16. Other courses 24, 24 of brick are thereupon placed above the courses 23, 23 extending across the first mentioned courses at right angles thereto in spaced horizontal relation with each other of substantially the same distance apart as the courses 23, 23, so that a plurality of vertical flues or passages 25, 25 are formed extending throughout the height of the regenerative chamber. The first course of tiles 16, 16 in edgewise bricks is laid on top of tiles 16, 16 in edgewise position and extend at right angles thereto, the bricks of this course engaging the tiles 16, 16, the said tiles extending into the recesses so that the surfaces 21 and 22 of the bricks form the bearing or sustaining surface for the bricks 18 and the vertical shoulders 19 and 20 form spreaders or spacers for these bricks serving to hold them in proper position over the tile 16.

A second course of bricks is thereupon placed over the first course extending at right angles thereto, (Fig. 2) the ends of the bricks forming the second course being positioned over the adjacent ends of the bricks forming the first mentioned course with the bearing surfaces 21 and 22 resting upon the top corners of each of the lower adjacent bricks so that the bricks making up this course are each anchored at their ends against lateral displacement, at the same time holding the bricks of the lower course in vertical position. As the courses of brick making up the checkerwork are placed in position as above described the edges of the bricks are spaced apart from each other leaving a plurality of spaces 26, 26 underneath each of the courses with the exception of the lowermost course, so that the waste gases can spread out throughout the entire regenerative chamber and into the vertical passages so that if one of the vertical passages 25 becomes clogged by the waste matter from the furnace, the gas or air can pass to other vertical passages and through the regenerative chamber. The entire regenerative chamber is filled with checkerwork built up in a manner described, so that the bricks not only provide means for absorbing the heat but each course is anchored and stabilized in the regenerative chamber against sidewise slippage or lateral movement and the entire checkerwork is built together in interlocked relation so that it is held firmly in place and not easily displaced.

It will also be understood that almost the entire surface of each brick is exposed to the waste gases from the furnace resulting in a more rapid absorption of the heat units from this gas, and the consequent absorption of the heat units when the furnace is reversed, and air or gas passed through the checkerwork to be heated.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. Checkerwork for regenerators comprising in combination a plurality of courses of brick extending in horizontal directions and placed in rows in vertical directions, the bricks being held in spaced relation with each other in the horizontal courses and arranged in spaced relation with each other in respect to each adjacent course in a vertical direction.

2. Checkerwork for regenerator construction comprising in combination vertically spaced courses of brick laid in edgewise relation with each other and means whereby each course is interlocked to the lower adjacent course.

3. Checkerwork for regenerator construction comprising in combination a plurality of sets of angularly related courses of brick laid in edgewise relation with each other and interlocked together and means whereby each of said courses is spaced from each adjacent course extending in the same direction.

4. Checkerwork for regenerator construction comprising in combination courses of brick extending in horizontal directions at right angles to each other whereby vertically extending flues are formed through said checkerwork, the said bricks comprising the courses being notched on their under sides whereby the courses are interlocked with respect to each other, each course being vertically spaced with relation to each parallel adjacent course whereby horizontal extending flues are formed in said checkerwork.

5. Checkerwork for regenerators comprising in combination a plurality of horizontal courses of brick extending at right angles to each other and in rows with respect to vertical relation with each alternate course whereby vertical flues are formed through said checkerwork, the bricks comprising the said courses having notches at their under sides whereby lateral movement of the bricks comprising the courses is prevented, the courses in each direction being spaced in vertical relation with respect to each adjacent parallel extending course.

6. Checkerwork for regenerators comprising in combination a plurality of horizontal courses of brick extending at right angles to each other and in rows with respect to vertical relation with each alternate course whereby vertical flues are formed through said checkerwork, the said bricks comprising the courses having a pair of notches on one of their edges for engagement with the immediate adjacent lower course, the bricks making up the courses being identical in contour.

7. Checkerwork for regenerators comprising in combination a plurality of horizontal courses of brick extending at right angles to each other and in rows with respect to vertical relation with each alternate course whereby vertical flues are formed through said checkerwork, each of said bricks having a notched portion on one of its edges only whereby horizontal and vertical bearing surfaces are formed on said brick, the said vertical bearing surfaces being adapted to engage the adjacent lower course of bricks whereby side slippage of the bricks is prevented.

8. A brick for checkerwork construction comprising a rectangular shaped member having notched out portions in one edge thereof whereby a vertical surface and a horizontal bearing surface are formed on each brick.

9. Checkerwork for regenerators comprising in combination, a plurality of courses of brick, each course being laid in angular position with respect to each adjacent upper and lower course, and alternate courses being arranged in vertical spaced relation with each other whereby vertical flues are formed in said checkerwork and also horizontal flues formed therein extending in two directions, the bricks of each course being held in spaced lateral relation with each other by the angularly disposed course immediately above it.

10. Checkerwork for regenerators comprising in combination, a plurality of courses of brick, laid at right angles to each other, and alternate courses being arranged in vertical spaced relation with each other whereby vertical flues are formed in said checkerwork and rows of horizontally extending flues are formed therein extending across the checkerwork in two directions, the said flues crossing each other at right angles.

11. Checkerwork for regenerative chambers comprising bricks laid in courses, each course being in angular relation with respect to the adjacent courses whereby vertical flues are formed in the checkerwork, said angularly related courses being interlocked to each other, certain of the courses extending in parallel relation to each other and vertically spaced apart whereby horizontal flues are formed in the checkerwork.

12. Checkerwork for regenerative chambers comprising bricks of substantially identical contour laid in courses, each course being in angular relation with respect to the adjacent courses whereby vertical flues are formed in the checkerwork, said angularly related courses being interlocked to each other, certain of the courses extending in parallel relation to each other and vertically spaced apart whereby horizontal flues are formed in the checkerwork.

Signed at Chicago, Illinois, this 27th day of August, 1926.

ALBERT E. PETERSON.